United States Patent [19]

Wigman et al.

[11] Patent Number: 4,783,434

[45] Date of Patent: Nov. 8, 1988

[54] PROCESS FOR LOADING A CARRIER WITH A CATALYTICALLY ACTIVE MATERIAL OR WITH A PRECURSOR OF A CATALYTICALLY ACTIVE MATERIAL, AND THE CATALYST PRODUCED BY SAID PROCESS

[75] Inventors: Johannes M. Wigman, Philippine; John W. Geus, Bilthoven, both of Netherlands; Jacobus E. Bongaarts, Destelbergen, Belgium; Garmt R. Meima, Amersfoort, Netherlands

[73] Assignee: The Dow Chemical Company, Midland, Mich.

[21] Appl. No.: 925,193

[22] Filed: Oct. 31, 1986

[51] Int. Cl.$^4$ .......................... B01J 31/04; B01J 31/22
[52] U.S. Cl. ...................................... 502/167; 502/170; 502/100; 502/300; 502/336; 502/347; 502/348; 502/352; 502/510; 502/512; 502/527
[58] Field of Search ............... 502/100, 300, 336, 348, 502/352, 512, 527, 167, 170, 347, 510

[56] References Cited

U.S. PATENT DOCUMENTS

| | | | |
|---|---|---|---|
| 3,702,259 | 11/1972 | Nielsen | 502/348 X |
| 3,843,745 | 10/1974 | Christman et al. | 260/680 E |
| 3,957,692 | 5/1976 | Cairns et al. | 502/527 X |
| 3,985,683 | 10/1976 | Stenzel | 502/527 X |
| 4,066,575 | 1/1978 | Winnick | 252/475 |
| 4,206,128 | 6/1980 | Cavitt | 502/348 X |
| 4,242,235 | 12/1980 | Cognion et al. | 502/348 X |
| 4,248,740 | 2/1981 | Mitsuhata et al. | 502/348 |
| 4,350,616 | 9/1982 | Boussert | 502/348 |
| 4,471,071 | 9/1984 | Rebsdat et al. | 502/348 X |
| 4,483,942 | 11/1984 | Sekido et al. | 502/255 |
| 4,701,437 | 10/1987 | Boxhoorn et al. | 502/348 |

FOREIGN PATENT DOCUMENTS

| | | |
|---|---|---|
| 207541 | 1/1987 | European Pat. Off. . |
| 207542 | 1/1987 | European Pat. Off. . |
| 207550 | 1/1987 | European Pat. Off. . |
| 1170663 | 11/1969 | United Kingdom ............ 502/348 |

OTHER PUBLICATIONS

Kotter et al., "Preparation of Catalysts II", B. Delmon, P. Grange, P. Jacobs and G. Poncelot, eds., pp. 51–63, Elsevier, Amsterdam, (1979).

Lee et al., "Preparation of Catalysts III", P. Poncelet, P. Grange, and P. A. Jacobs, eds., pp. 35–45, Elsevier, Amsterdam, (1983).

E. R. Becker and T. A. Nuttall, "Preparation of Catalysts II", B. Delmon, P. Grange, P. Jacobs and G. Poncelet, eds., pp. 159–170, Elsevier, Amsterdam, 1979.

G. H. van den Berg et al., ibidem., pp. 265–277.

Primary Examiner—Patrick P. Garvin

[57] ABSTRACT

Active catalysts are prepared by (1) impregnating a carrier with a solution of a complex of an active composition or precursor thereof wherein the viscosity of the solution is not decreased upon heating or evaporation of the solvent, (2) removing the solvent and (3) decomposing the complex.

15 Claims, No Drawings

PROCESS FOR LOADING A CARRIER WITH A CATALYTICALLY ACTIVE MATERIAL OR WITH A PRECURSOR OF A CATALYTICALLY ACTIVE MATERIAL, AND THE CATALYST PRODUCED BY SAID PROCESS

BACKGROUND OF THE INVENTION

This invention relates to a process for loading a carrier with a catalytically active composition or with a precursor for a catalytically active composition, as well as to a catalyst produced by said process.

In solid catalysts, the catalytic active species is generally bound to the surface of the solid. For this reason the area of the active surface and its accessibility to reactants are co-determinative of the activity and selectivity of the catalyst. Activity, as used in this context, means the conversion of the reactants per unit volume of the catalyst and selectivity means the degree in which a desired reaction is accelerated relative to the acceleration of undesirable reactions. According to this definition of the activity, the area of the catalytically active surface per unit volume of the catalyst is determinative.

A high activity, therefore, requires a large active area per unit volume, which can only be achieved with small particles of the active component. The need of using catalytically active components in finely-divided form has a number of major drawbacks.

First, solid catalysts must generally have a high mechanical strength. It is difficult, however, to process finely-divided material to mechanically strong moldings while retaining a high porosity, because the pore structure thus obtained is generally unfavorable. In fact, the pores are often too narrow pores with too large effective pore length ("tortuousness"). Moreover, in the case of many catalytically active elements and compounds, processing to mechanically strong moldings is not possible at all.

Second, many catalytic reactions are carried out at temperatures and in gas atmospheres whereby small particles of the active component are rapidly sintered to form much larger particles; the concomitant decrease in active area leads to a rapid loss in activity.

Third, as the pores in a system of very small particles are mostly narrow, the transport of reactants and reaction products in the catalyst is difficult. This leads to a reduced activity of the catalyst, while its selectivity is also adversely affected.

To overcome the problems outlined above, so-called carriers or supports are generally used in heterogeneous catalysts. A carrier can be satisfactorily processed to a thermostable, mechanically strong body of the desired dimensions, while the pore structure of the carrier can be effectively adjusted. The catalytically active composition, or a precursor thereof, is applied to the carrier surface, mostly in extremely finely-divided form. Generally speaking, the surface of the carrier is not catalytically active. Although the carrier greatly dilutes the catalytically active composition, the fact that the catalytically active composition is no longer sintered at high temperatures causes the thermostable catalytically active surface area to be considerably greater than without the use of a carrier.

To promote as efficient a utilization of the carrier as possible, the active component must be applied to the surface of the carrier in finely-divided form and as homogeneously as possible. In principle, it is possible to load small particles of the desired carrier relatively simply with the catalytically active composition or a precursor thereof in such a manner that it is uniformly distributed over the carrier surface as small particles. Precursor as used in this context means the element or compound which later is converted into the catalytically active composition, for example, by a thermal treatment or a chemical reaction such as reduction.

In the preparation of solid catalysts on a technical scale, the application of the catalytically active composition to the carrier is in many cases problematic. In fact, the active component cannot in many instances be applied to the carrier. For example, in the case of many catalytically active, zero valent metals, it is impossible for them to be directly applied to a carrier in finely-divided form. In such cases, a hydrated oxide of the metal, the catalytic precursor, is applied to a carrier in finely-divided form. Thereafter, during a separate thermal pre-treatment, the metal oxide is reduced to the metal.

When small particles of the carrier are used, the pores present in the carrier are short. As a result, the migration of the precursor of the active component into the carrier particle can readily proceed. However, small particles of carrier cannot be used in some much-used catalytic reactors, namely, those in which the catalyst is present in a solid bed. When small particles of carriers are used in a solid bed reactor, the pressure drop across the catalyst bed becomes intolerably high. Also, "channeling" often occurs, which is the phenomenon that the reactants flow through a limited part of the cross-section of the reactor only, namely, at the places where the particles are in motion.

A necessary characteristic of useful catalysts is a high mechanical strength. During the filling of a reactor, substantial forces are exerted on the catalyst. During the starting-up and stopping of the reactor, the catalyst is often subjected to large differences in temperature. Breakage of catalyst particles or bodies in the reactor is highly undesirable. This leads to poor distribution of the reactants over the cross-section of the catalyst bed or over a number of parallel-connected reactor tubes.

In some, but not all, cases, it is possible to load a powdered carrier first with the catalytically active composition or a precursor, for example, as described above—and subsequently to process the composite to larger moldings having the necessary mechanical strength.

Many catalyst systems which, by themselves, are attractive, have never been applied on a technical scale, because it was impossible for them to be processed to bodies having the required mechanical strength. For this reason there has been a need for a long time of a technically feasible method of loading carrier bodies or particles with the active composition or precursor. In fact, using this, first carrier bodies of the desired sizes and mechanical strength can be made. Thereafter, these bodies are loaded with the active composition or precursor thereof.

The methods used according to the state of the art for applying the active compositions or precursors to carrier bodies do not usually lead to the desired uniform distribution of the active composition. The procedure most commonly used is the impregnation of the carrier particle bodies with a solution of a precursor of the active composition, the solvent of which is removed by drying. However, it is often observed that the precursor of the active composition is only deposited on the outer surface of the carrier bodies or at the pore mouths.

Some authors believe that viscous flow owing to capillary forces is the driving force behind the migration to the outside of the carrier body of the nonvolatile components of the solution remaining behind during drying (N. Kotter and L. Riekert in "Preparation of Catalysts II", B. Delmon, P. Grange, P. Jacobs and G. Poncelet, eds., pp. 51–63, Elsevier, Amsterdam, 1979).

These authors have therefore proposed to use a viscous solution of the active composition in the impregnation. As the authors state, the use of a viscous solution does indeed lead to a somewhat more homogeneous distribution of the active composition on the carrier. One disadvantage of impregnating with a viscous solution is, however, that the viscous solution cannot well penetrate into long, relatively narrow pores, as generally occur in shaped carrier bodies or particles.

Other authors believe that the gas which remains behind in the pores of the carrier body during the impregnation forces the nonvolatile elements of the solution to the outside of the carrier particles (S. Y. Lee and R. Aris in "Preparation of Catalysts III", P. Poncelet, P. Grange and P. A. Jacobs, eds., pp. 35–45, Elsevier, Amsterdam, 1983). As can be inferred from the detailed publication by Lee and Aris, many factors which are difficult to control play a role in the impregnation and drying of catalyst bodies such as pellets. The result is that the distribution of the active component after impregnation and drying is often far from uniform.

As observed above, this is generally unfavorable for the activity of the catalyst. In some cases, where poisoning of the active composition occurs, the active composition is deliberately distributed non-uniformly over the carrier body. This practice is generally unattractive.

In order to render the distribution more homogeneous, the above-cited teaching of Kotter and Riekert proposed to increase the viscosity of the solution used for impregnation by adding hydroxyethyl cellulose to the solution. While this results in a homogeneous distribution of the precursor, unfortunately, the viscous solution of the precursor can hardly, if at all, penetrate the narrow pores of a carrier body. Thus, no homogeneous distribution is obtained during the impregnation.

According to another known method, the so-called deposition-precipitation technique, an amount of solution of the active component is added which is just sufficient to fill the pores of the carrier body. This method is also sometimes referred to as an embodiment of dry impregnation or "incipient wetness" impregnation. In addition to the catalytically active composition, the solution contains urea, ammonium cyanate or another compound which upon hydrolysis increases the pH. After the bodies have been impregnated at such a low temperature that there is no appreciable hydrolysis, the temperature is increased. The active composition, including precursor thereof, can then deposit on the surface of the carrier, provided there is a sufficient interaction between the nuclei of the precipitating composition and the carrier surface. In some cases, however, this process cannot be used. In some cases, there is no good interaction with the carrier. In others, there are a number of important active materials which cannot be precipitated by increasing the pH of the liquid.

There is another condition which should be satisfied in developing a universal method of applying a catalytically active composition, including precursor thereof, to carrier bodies, namely, that the accessible area and the pore distribution of the resulting laden carrier should not differ from that of the non-laden carrier. Thus, in particular to obtain a good selectivity, the pore structure of the ultimate catalyst must be capable of being effectively adjusted. Accordingly, the application of the active component must not appreciably affect the suitable pore structure of the carrier. This latter is especially to be feared if the active composition or precursor is deposited on the carrier in the form of small clustered particles. In that case the often narrow pores between the small particles of the active component lead to an additional porosity which is mostly unfavorable.

Therefore, it would be highly desirable to provide a generally suitable process for applying a catalytically active composition or precursor thereof to a carrier, particularly a shaped carrier, without appreciably changing the accessible area and the pore structure.

SUMMARY OF THE INVENTION

In one aspect, the present invention is a process to provide a uniform distribution of a catalytically active composition over the interior and exterior surfaces of carrier bodies. This process comprises impregnating a carrier having a surface area less than about 20 $m^2/g$ with a solution of a complex of a catalytically active composition, the viscosity of which solution is not decreased upon heating and/or upon evaporation of the solvent, and subsequently evaporating the solvent and decomposing the complex by heating. For the purposes of this invention, the term "catalytically active composition" or "active composition" is a generic term which includes catalytic components such as zero valent metals, catalytic compounds such as lower valent metal oxides, and precursors of catalytic components or compounds. Surprisingly, it has been found that by using such a process, the compound of the active component remains homogeneously distributed in the pores of the carrier.

DETAILED DESCRIPTION OF ILLUSTRATIVE EMBODIMENTS

The carriers suitably employed in the process of the present invention are those used in conventional heterogeneous catalysis. Examples of suitable carriers are oxidic compounds, such as silicon dioxide, aluminum oxide, silicon oxide/aluminum oxide, magnesium oxide, zirconium oxide and titanium dioxide. Examples of other carriers are carbon and carriers used less often, such as silicon nitrides or carbides. Such carriers have an average surface area less then about 20 square meters per gram ($m^2/g$), prefereably less than about 15 $m2/g$, most preferably less than about 10 $m^2/g$. Such carriers have an average surface area of at least about 0.1 $m^2/g$.

The solution of a metal complex having a viscosity that does not decrease upon heating, can be obtained in several ways. In one embodiment of the invention, a solution of a complex of the catalytically active composition is used, the viscosity of which increases upon heating and evaporation of the solvent. First, it is possible to use a solution of the active composition (i.e., an active component, a compound of the active component or precursor thereof), which is in such a form that, upon evaporation of the solvent, the viscosity is increased. This is basically the case with compounds that do not properly crystallize. Another possibility is the use of a solution of a complex or a compound of the active composition wherein viscosity even increases upon heating. A third possibility consists in adding a substance which has such an effect on the solution of the active composition that a higher viscosity is obtained upon heating.

The specific choice of the most suitable complexing agent depends on all sorts of factors, such as the specific ion to be complexed and the valence thereof and the carrier material to be impregnated. Naturally, it is essential that the agent which complexes with the ions of the active precursor, in combination with the solvent used, does not lead to a decrease in viscosity when heated. Suitable complexing compounds are, for example, ethylene diamine tetraacetic acid (EDTA), citric acid, lactic acid, and the like. It is noted that the use of, for example, citric acid in the impregnation of bodies of carriers is known per se. In this connection, reference can be made to E. R. Becker and T. A. Nuttall in "Preparation of Catalysts II", B. Delmon, P. Grange, P. Jacobs and G. Poncelet, eds., pp. 159–170, Elsevier, Amsterdam, 1979 and G. H. van den Berg and H. Th. Rijnten, ibidem. pp. 265–277. In that case, however, the acid is added to produce a non-homogeneous distribution of, especially, noble metals over aluminum oxide bodies. The acid exhibits competitive adsorption with a negatively-charged noble metal complex, such as, for example, hexachloro platinic acid, as a result of which the platinum is only deposited in the middle of the carrier body. In this procedure, generally speaking, the impregnation period is kept relatively short, and the thermal decomposition of a complex with citric acid does not take place.

In another embodiment, a solution of a complex of the active composition is used, in which the crystallization of the solid complex does not proceed, or at a low rate, upon heating and evaporation of the solvent.

Generally speaking, the use of a solution of the active composition or complex thereof from which no, or substantially no, crystallization (of a compound) of the active composition occurs is preferred. This substantial prevention of crystallization of the active composition can be achieved by adding to the solution of the active composition a compound such as sugar, glucose, fructose or similar compounds which are readily soluble in the solvent and poorly crystallizable. The concentration of such poorly crystallizing compound is selected so that the viscosity of the solution with which the carrier is impregnated is not much higher than that of the solution which only contains the active composition.

In order that the active composition may be deposited over the interior surfaces of the bodies of the carrier as uniformly as possible, it is of importance that, as the solution of the complex of the active composition is heated its viscosity is increased so that no, or substantially no, migration of the active composition to external surface of the body of the carrier takes place.

After the removal of the solvent and thermal decomposition of the complex of the active composition, much of the material deposited on the carrier still contains carbonaceous products. These can be removed, for example, by oxidation at elevated temperature. Owing to the uniform distribution of the catalytically active composition over the carrier surface, the active composition is not sintered during the oxidation at elevated temperature.

When the active composition must be used in a reduced form, the active composition can be reduced. Reduction can be effected with gaseous reducing agents, such as hydrogen or carbon monoxide at elevated temperatures. By adjusting the hydrogen/water or the carbon monoxide/carbon dioxide ratio, the degree of reduction can be controlled, for example, to a lower oxide or to the corresponding metal. The reduction may also be carried out at lower temperature with a dissolved reducing agent. Examples of dissolved reducing agents are hydrazine, hydroxylamine, lithium boron hydride, or sodium aluminum hydride. Weaker reducing agents that can be used in the dissolved state are formaldehyde, methanol or glucose.

A major advantage of the process of this invention is that it makes it possible for an active composition with a large specific area to be applied to a carrier having wide pores, and hence a surface that is well accessible, without agglomerates of small particles of the active composition leading to the presence of narrow pores in the catalyst system. In the case of catalysts for selective reactions, such as the oxidation of ethylene to ethylene oxide, or of methanol to formaldehyde, it is especially important that the catalyst should not contain narrow pores. The relatively long residence time of the reaction product in the narrow pores leads to oxidation and the formation of undesirable products.

The process of this invention is very suitable for applying silver to bodies of alpha-aluminum oxide. In such an embodiment, tin(II) or tin(IV) is applied to the carrier via a citrate or EDTA complex, using the process of this invention. The process of the invention causes the tin oxide (which results after drying of the impregnated carrier, decomposition of the complex and oxidation of the carbonaceous products) to be deposited as a continuous layer on the aluminum oxide surface. The tin oxide can be reduced, for example, with hydrogen or with formaldehyde to form tin(II) oxide. If, subsequently, it is reacted with dissolved silver ions, the silver is deposited upon the carrier surface uniformly and in finely-divided form. As tin oxide leads to excellent adherence of the silver to the carrier, the resulting silver catalyst is extremely thermostable.

As stated before, the process of this invention is particularly suitable for applying active compositions uniformly over the surface of large porous carrier bodies. The interior surfaces of these carrier bodies are also uniformly coated with the active composition. Of great importance is that the process is also very suitable for large-scale application. Large quantities of carrier bodies may very well be impregnated with a solution of an active composition by the "incipient wetness" method. In a preferred embodiment of the invention, the carrier is evacuated prior to the impregnation with the solution of a complex of the active composition, if necessary at elevated temperature. Extraordinarily good results are achieved when the bodies of the carrier are previously evacuated. Preferably, such evacuation is effected at elevated temperature. In a preferred embodiment of the invention, the bodies of the carrier are impregnated with just so much of the solution of a complex of the active composition as is needed for filling the pore volume of the carrier. Filling the interior pore system of the bodies of the carrier then proceeds extremely readily. Drying and heating the impregnated body, too, can be effected on a large scale without any objection.

The process of the invention is also particularly suitable for applying a carrier to a specific structure, such as, for example, a "monolithic" or "honeycomb" structure in the preparation of a "shaped" carrier body. These non-porous structures are used on account of their low flow resistance. A thermostable finely-divided carrier must be applied to the surface of the structure: to this thermostable carrier, a catalytically active component is applied to form the desired shape. According to the state of the art, this is effected by immersing the structure in a suspension of, for example, aluminum oxide or silicon dioxide in finely to extremely finely-divided form ("dip coating"). Subsequently, the structure is kept at an elevated temperature to fix the small particles on the surface of the structure. In these cases, however, the density of the small particles that can be applied per dip is rather poor. Often, the structure must be immersed many times to produce a fair surface. In the process of the present invention, an aluminum oxalate solution is, for example, applied to the structure. When the oxalate solution is previously heated, its viscosity can be adjusted so that a sufficient amount of the solution can be applied to the structure in one step.

The invention is illustrated in and by the following examples.

EXAMPLE 1

A 0.85-g portion of Sn(II)oxalate (Fluka A.G., purum) is introduced together with 0.79 g of citric acid (Merck p.a.) in about 15 ml of deionized water. The pH is increased with concentrated ammonia (25 percent by weight) to a value of 5.8, at which the solution is clear. In this solution, the bivalent tin is present as the citrate complex. If no complexing agent is present, the Sn(II) would hydrolyze at this pH. The solution is made up with deionized water to a final volume of 21.5 ml.

Alpha-aluminum oxide pellets (50.0 g) (Norton SA 5525 HPC) are then impregnated with the above solution by the incipient wetness procedure. These pellets are cylindrical with a diameter of about 5 mm and a length of about 7 mm and have BET area of 0.27 $m^2/g$. BET represents the Brunauer-Emmett-Teller method for measuring surface area. The pellets thus treated are dried for about 30 minutes at 120° C. and, on the basis of Sn(O) contain 0.97 percent by weight of Sn. Subsequently, the BET area is measured after 20 hours calcination as a function of the calcination temperature. After drying at 120° C., no increase in area is to be measured relative to that of the pure carrier. This indicates that there has been no decomposition in the complex and that, accordingly, no $SnO_2$ particles have formed. After the calcination at 500° C., an area of 0.86 ±0.02 $m^2/g$ is measured; at 750° C 1.01±0.04 $m^2/g$; at 850° C. 0.68±0.01 $m^2/g$; at 1000° C. and at 1250° C., no increase in area relative to that of the pure carrier material is measured.

The above results indicate that the $SnO_2$ is sintered as a function of the temperature after first being deposited on the $Al_2O_3$ surface as extremely small particles at low temperature. This is confirmed with mercury porosimetry. Electron microscopy confirms the above picture. In addition, it is shown by means of elemental analysis in the scanning microscope that the $SnO_2$ distribution is homogeneous throughout the entire pellet. Sometimes a somewhat higher load is observed on the outside of the pellet.

EXAMPLE 2

A 0.69-g portion of Sn(II)oxalate (Fluka A.G., purum) is dissolved in a solution of 60 percent by weight formic acid (Merck, "reinst"). The pH is increased with concentrated ammonia (25 percent by weight) to a value of 3.9. A solution with a volume of 5.6 ml results. This solution contains the bivalent tin as the $Sn(HCO_2)_3$ complex. The formate ion, which is a stronger ligand than the hydroxide ion, prevents hydrolysis of the tin(II).

A 78.84-g portion of alpha-aluminum oxide pellets (Norton SA 5525 HPC) is impregnated with the above solution by the incipient wetness procedure. These pellets are cylindrical with a diameter of about 5 mm and a length of about 7 mm and have a BET area of 0.27 $m^2/g$.

The pellets thus prepared are dried for about 4 hours at 120° C., and on the basis of Sn(O) contain 0.50 percent by weight of Sn. Subsequently, the BET area is measured after 24 hours' calcination as a function of the calcination temperature. After drying at 120° C., no increase in area is to be measured relative to that of the pure carrier material. This indicates that there has been no decomposition of the complex and that, accordingly, no $SnO_2$ particles have as yet formed. After calcination at 300° C., an area of 1.82±0.06 $m^2/g$ is measured: at 500° C. 1.31 $m^2/g$; at 750° C. 0.88 $m^2/g$; and at 1250° C. no increase in area is observed relative to the pure carrier.

The above results indicate that the $SnO_2$ is sintered as a function of the temperature after first being deposited on the $Al_2O_3$ surface as extremely small particles at low temperature. This is confirmed by mercury porosimetry. Electron microscopy confirms the above picture. In addition it is shown by means of elemental analysis in the scanning microscope that the $SnO_2$ distribution is homogeneous throughout the entire pellet. Sometimes, a somewhat higher load is observed on the outside of the pellet.

EXAMPLE 3

A 0.70-g portion of Sn(II)oxalate (Fluka A. G., "purum") is introduced with 0.98 g of EDTA into about 25 ml of deionized water. With concentrated ammonia, the pH is increased to a value of 6.0. At this pH the solution is clear. This indicates that the bivalent tin has formed a complex with the EDTA, as without the addition of the EDTA the tin would hydrolyze. The solution is made up with deionized water to a final volume of about 31.8 ml.

A 79.6-g portion of alpha-aluminum oxide pellets (Norton SH 5525 HPC) is impregnated with the above solution by the incipient wetness procedure. These pellets are cylinders having a diameter of about 5 mm and length of about 7 mm, and possess a BET area of 0.27 $m^2/g$. The pellets thus prepared are dried at 120° C. for about 16 hours and on the basis of Sn(O) contain 0.50 percent by weight of Sn.

After calcination of 750° C. (in air) for 24 hours, a homogeneous distribution of the $SnO_2$ over the $Al_2O_3$ is observed by means of elemental analysis in the scanning electron microscope. At a somewhat higher load, a somewhat higher tin concentration is sometimes observed on the outside of the pellet.

EXAMPLE 4

A 5.32-g portion of $Fe(NO_3)_2.9H_2O$ is dissolved in a small quantity of demineralized water. A 3.9-g portion of EDTA is dissolved in a small quantity of a 25 percent $NH_3$ solution. The two solutions are combined and a precipitate is formed. To the suspension thus formed as much 25 percent $NH_3$ solution is added as to dissolve all precipitate and adjust the pH value to 7. The colour of the resulting solution is blood red. Subsequently, the solution is made up with demineralized water to a total weight of 20 g.

A 20-g portion of alpha $Al_2O_3$ (Fluka, surface area 6.5 $m^2/g$) is impregnated with the above solution. The impregnated tablets are allowed to stand at room temperature for 48 hours, thereafter the temperature of the tablets is rapidly raised to 500° C., at which temperature they are calcined for 18 hours.

After calcination, the B.E.T. area of the laden tablets is 6.9 $m^2/g$. An examination in the electron microscope shows that iron oxide is deposited on the aluminum oxide as a thin uniform layer.

What is claimed is:

1. A process for preparing a carrier for loading with a catalytically active composition or with a precusor of a catalytically active composition, which process comprises (1) impregnating a carrier having a surface area less than about 20 $m^2/g$ with a solution of a complex of tin or iron and citric acid, formic acid, lactic acid or ethylenediamine tetraacetic acid in a solvent, the viscosity of which solution is not decreased upon heating or evaporation of the solvent, (2) subsequently removing the solvent, and (3) decomposing the complex, thereby providing a uniform distribution of the decomposed complex over the interior and exterior surfaces of the carrier.

2. The process of claim 1 wherein the solvent is removed by heating and evaporation and the viscosity of the solution of the complex is increased upon heating and evaporation of the solvent.

3. The process of claim 2 wherein the complex is a solid that does not undergo a significant crystallization upon heating and evaporation of the solvent.

4. The process of claim 3 wherein the carrier is impregnated with as much of the solution of the complex as is needed to just fill the pore volume of the carrier.

5. The process of claim 4 wherein the carrier is evacuated, optionally at elevated temperature, prior to the impregnation with the solution.

6. The process of claim 5 wherein compound that is poorly crystallizable and readily soluble in the solvent is added to the solution of the complex.

7. The process of claim 6 wherein any carbonaceous products remaining after decomposition of the complex are removed by oxidation at elevated temperature.

8. The process of claim 7 wherein the catalytically active composition is a metal compound which is reduced to a lower-valence oxide or to the corresponding zero valent metal.

9. The process of claim 1 wherein a finely-divided, thermostable material capable of functioning as a carrier material is applied to a non-porous structure to form a shaped carrier.

10. A modified carrier composition comprising a carrier having a uniform distribution of a decomposed complex of tin or iron and citric aicd, formic acid, lactic acid or ethylenediamine tetraacetic acid over the interior and exterior surfaces of the carrier, said modified carrier having been prepared by the process of claim 1.

11. An active catalyst comprising a catalytic amount of metallic silver deposited on the modified carrier of claim 10 wherein the metallic silver is homogeneously distributed in the pores of the carrier.

12. The modified carrier of claim 10 wherein the carrier is alpha-aluminum oxide and the complex is stannous citrate, stannous formate, stannous ethylenediamine tetraacetate or ferrous ethylenediamine tetraacetate.

13. An active catalyst comprising a catalytic amount of metallic silver deposited on the modified carrier of claim 12 wherein the metallic silver is homogeneously distributed in the pores of the modified carrier.

14. The process of claim 2 wherein the solvent is removed without increasing the surface area of the carrier.

15. The process of claim 6 wherein said compound is sugar, glucose or fructose.

* * * * *